Oct. 27, 1936.　　　J. V. O. PALM ET AL　　　2,059,019

BEARING ALLOY

Filed Feb. 20, 1936

INVENTORS
John V. O. Palm and
Carl E. Swartz
BY Fay, Oberlin & Fay ATTORNEYS

Patented Oct. 27, 1936

2,059,019

UNITED STATES PATENT OFFICE 2,059,019

BEARING ALLOY

John V. O. Palm and Carl E. Swartz, Cleveland Heights, Ohio, assignors to The Cleveland Graphite Bronze Company, Cleveland, Ohio, a corporation of Ohio Application February 20, 1936, Serial No. 64,916

5 Claims. (Cl. 75—175)

The present invention relates to a bearing alloy and is particularly directed to one in which bearing material of the nature of tin babbitt has added to it an additional substance which materially increases the resistance to fatigue of the bearing alloy at elevated temperatures without detrimentally affecting the ductility or the tensile strength. The object of the invention is the provision of a bearing alloy capable of withstanding very much harder service at elevated temperatures than the ordinary tin babbitts now in general use for such purposes as the journaling of crankshafts, camshafts, connecting rods and the like, in internal combustion engines and similar mechanism.

To the accomplishment of the foregoing and related ends, said invention, then, consists of the means hereinafter fully described and particularly pointed out in the claims; the annexed drawing and the following description setting forth in detail certain structure embodying the invention, such disclosed structure constituting however, but one of various ways in which the principle of the invention may be used.

In said annexed drawing:—

Figure 1:
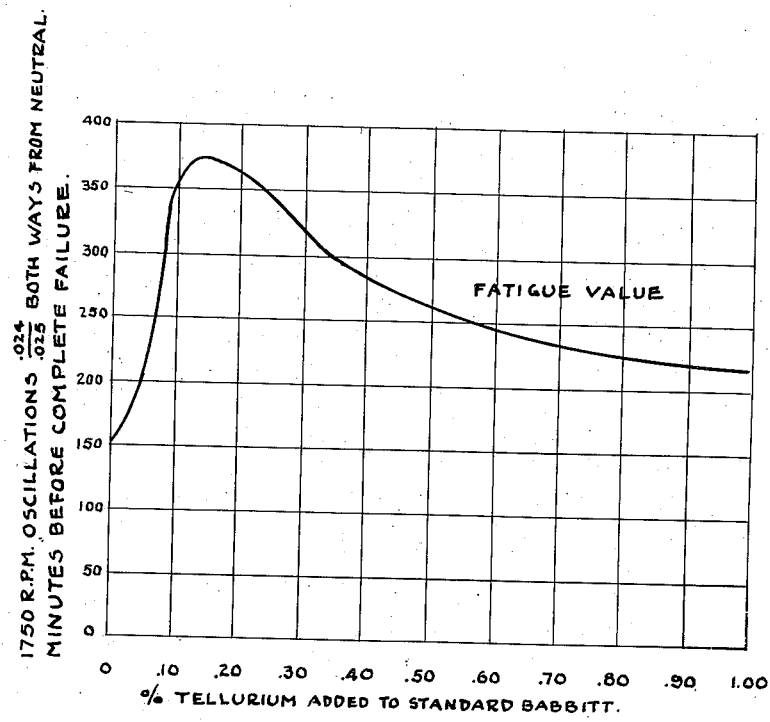
Figure 2:
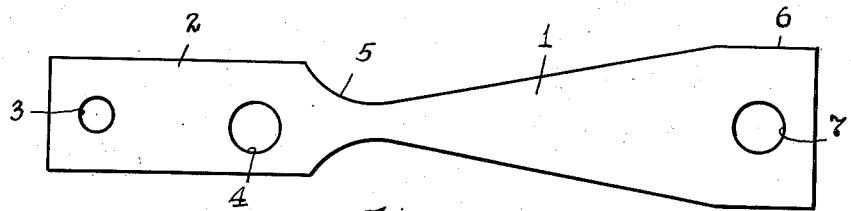
Figure 3:

Fig. 1 is a view representing diagrammatically the fatigue value of our improved bearing alloy for different percentages of the material added; Fig. 2 is a plan view showing a typical specimen formed for testing fatigue; and Fig. 3 is a side elevation of the strip of Fig. 2.

A commonly used tin babbitt consists of 3¼% copper, 7½% antimony and the balance tin, and is usually referred to as a tin babbitt, although tin babbitts vary in composition for various purposes. For example, the copper content may range from as little as from ½% up to 10% and the antimony from 1% to 12%, with the balance of the alloy in each case being tin, and such mixtures are still suitable as bearing alloys and are designated as tin babbitt. Such alloys are extremely useful as bearings and are widely employed for journaling crankshafts, camshafts, connecting rods and similar rotating parts under extremely heavy duty, but it has been found that at elevated temperatures this type of bearing is subject to fatigue and in some cases is subject to failure in use. As a result, users have sought to employ other materials, such as mixtures of copper and lead which, while no better and in some cases not as good a bearing material as a tin babbitt, under ordinary temperatures and under ordinary conditions are still superior at elevated temperatures and under severe operating conditions. Such other mixtures, however, have the disadvantages of being extremely difficult to process during manufacture because of the very much higher temperatures at which the predominant metal in the mixture becomes molten.

We have discovered that certain of the tin babbitts can be improved as much as 300% in its resistance to fatigue at elevated temperatures by the addition of minute amounts of tellurium. For example, the addition of as little as 1/100% of tellurium will increase the resistance to fatigue of the babbitt somewhat and the use of .08 of 1% will produce a very marked increase of resistance to fatigue, approximating 200%. The best results which we have obtained in resistance to fatigue have been secured with the use of between .08 and .16% of tellurium but an increase of from 50% to 100% of resistance to fatigue is obtained by using from .04 to 2.0% of tellurium.

In the drawing we have shown a graph in which the fatigue value of our improved bearing alloy is plotted against compositions carrying varying amounts of tellurium. The standard babbitt mixture already referred to is plotted on the graph as 100 and it will be seen that for an increase of .10% of tellurium, an increase in the fatigue value is secured of roughly 200%, which rises slightly above that value for approximately .15% of tellurium, and then slowly drops away as increasing amounts of tellurium are added, but remains above 200% of the original fatigue value up to at least 1.00% of tellurium.

Fatigue as indicated in this graph was measured in the standard way by reverse bending of strips of our bearing alloy containing tellurium, the bending being carried on at a rate of 1750 cycles per minute at a temperature of approximately 300° F., which would approximate the upper limit of temperature of the bearing material in service.

In Fig. 2 I have shown a test specimen employed to determine the fatigue values already referred to, which consists of a strip of our improved bearing metal 1, provided at one end with a substantially rectangular portion 2 provided with holes 3 and 4 and adjoining a cut-away portion 5 extending to an enlarged end portion 6 provided with an opening 7. This piece 1 is tested by bolting the head of a reciprocating member to the holes 3 and 4 in a rectangular end 2 and securing to a fixed member the other end 6 by means of a bolt through the hole 7. The reciprocating element, to which is secured the end 2, is moved at right angles to the plane of the strip 1 at a speed of 1750 cycles per minute and through an amplitude of from .048 to .050 with the end 2 of the test strip moving .024 to .025 either way from its original or neutral plane. This test is carried on with the piece maintained at a temperature of approximately 300° F. and the fatigue values shown in the graph in Fig. 1 were determined from test strips of this type, which were put through the test just described.

In many cases tellurium has the effect on certain tin babbitts of improving the tensile strength at elevated temperatures without materially affecting the ductility, which is surprising as it would be expected that the addition of a substance such as tellurium would increase the brittleness of the alloy to which it was added, reducing the ductility and the tensile strength. We have found that within a range of 1 to 25% of tellurium added to certain tin babbitt alloys no appreciable decrease in tensile strength or injurious decrease in ductility is noted.

The addition of tellurium in certain cases to tin babbitts has the effect of improving very materially the fluidity of the alloy during melting and pouring, and this of course is a very important advantage in that impurities on the steel or other metal against which the alloy is cast are cleaned off, and floated to the top by the more fluid alloy, producing a very much better bond between the steel or other backing metal and the alloy. In addition to making the bond between alloy and backing metal self-cleaning, the improved fluidity of the metal improves the general character and structure of the metal when solidified since very much less gas is entrapped and the metal is therefore denser and less porous than would otherwise be the case.

Other modes of applying the principle of our invention may be employed instead of the one explained, change being made as regards the structure herein disclosed, provided the means stated by any of the following claims or the equivalent of such stated means be employed.

We therefore particularly point out and distinctly claim as our invention:

1. A bearing alloy consisting of from ½ to 10% copper and 1 to 12% antimony, from .01 to 10% of tellurium, and the balance tin.
2. A bearing alloy consisting of from ½ to 10% copper, and 1 to 12% antimony, from .01 to 2% of tellurium, and the balance tin.
3. A bearing alloy consisting of from ½ to 10% copper, from 1 to 12% antimony, from .03 to 5% of tellurium, and the balance tin.
4. A bearing alloy consisting of from 3 to 7½% copper, 5 to 10% antimony, from .1 to .2% of tellurium and the balance tin.
5. A bearing alloy consisting of 3¼ to 6½% copper, 7 to 8% antimony, .08 to .16% tellurium and the balance tin.

JOHN V. O. PALM.
CARL E. SWARTZ.